(12) United States Patent
Johnson

(10) Patent No.: US 11,239,513 B2
(45) Date of Patent: Feb. 1, 2022

(54) THERMO-ELECTROCHEMICAL CONVERTER

(71) Applicant: Johnson IP Holding, LLC, Atlanta, GA (US)

(72) Inventor: Lonnie G. Johnson, Atlanta, GA (US)

(73) Assignee: JOHNSON IP HOLDING, LLC, Atlanta, GA (US)

( * ) Notice: Subject to any disclaimer, the term of this patent is extended or adjusted under 35 U.S.C. 154(b) by 280 days.

(21) Appl. No.: 16/324,773

(22) PCT Filed: Aug. 10, 2017

(86) PCT No.: PCT/US2017/046203
§ 371 (c)(1),
(2) Date: Feb. 11, 2019

(87) PCT Pub. No.: WO2018/031713
PCT Pub. Date: Feb. 15, 2018

(65) Prior Publication Data
US 2019/0173142 A1 Jun. 6, 2019

Related U.S. Application Data

(60) Provisional application No. 62/374,252, filed on Aug. 12, 2016.

(51) Int. Cl.
| | | |
|---|---|---|
| *H01M 14/00* | (2006.01) | |
| *H01M 8/04029* | (2016.01) | |
| *H01M 8/22* | (2006.01) | |
| *H01M 8/04007* | (2016.01) | |
| *H01M 8/18* | (2006.01) | |
| *H01M 8/04858* | (2016.01) | |

(52) U.S. Cl.
CPC ....... *H01M 14/00* (2013.01); *H01M 8/04029* (2013.01); *H01M 8/04925* (2013.01);
(Continued)

(58) Field of Classification Search
CPC .... H01M 8/18; H01M 8/182; H01M 8/04029; H01M 14/00; F25B 23/00; F25B 30/00
See application file for complete search history.

(56) References Cited

U.S. PATENT DOCUMENTS

| 4,927,793 A | 5/1990 | Hori et al. |
| 5,310,608 A | 5/1994 | Ishizawa et al. |
(Continued)

FOREIGN PATENT DOCUMENTS

| EP | 0595688 A1 | 5/1994 |
| EP | 2745930 A1 | 6/2014 |
(Continued)

OTHER PUBLICATIONS

Gellender, M., "A proposed new energy source: The "mixing energy" of engine exhaust gas," Journal of Renewable and Sustainable Energy, vol. 2, pp. 023101-1-023101-14 (2010).
(Continued)

*Primary Examiner* — Maria Laios
*Assistant Examiner* — Jordan E Berresford
(74) *Attorney, Agent, or Firm* — Panitch Schwarze Belisario & Nadel LLP

(57) ABSTRACT

A direct heat to electricity engine includes solid state electrodes of an electrochemically active material that has an electrochemical reaction potential that is temperature dependent. The electrodes are configured in combination with electrolyte separators to form membrane electrode assemblies. The membrane electrode assemblies are grouped into pairs, whereby each membrane electrode assembly of a given pair is ionically and electronically interconnected with the other. One membrane electrode assembly of a given pair is coupled to a heat source with the other to a heat sink. One membrane electrode assembly of the pair is electrically discharged while the other is electrically charged, whereby
(Continued)

the net and relative charge between the two remains constant because of the electronic and ionic interconnection and the difference in temperature of the membrane electrode assemblies, and thereby voltage, results in net power generation.

7 Claims, 10 Drawing Sheets

(52) U.S. Cl.
CPC ........... *H01M 8/182* (2013.01); *H01M 8/227* (2013.01); *H01M 8/04074* (2013.01); *Y02E 60/50* (2013.01)

(56) References Cited

U.S. PATENT DOCUMENTS

| | | | |
|---|---|---|---|
| 7,160,639 B2 | 1/2007 | Johnson et al. | |
| 10,137,409 B2* | 11/2018 | Hoshino | ............ B01D 53/1475 |
| 2003/0203276 A1* | 10/2003 | Johnson | ................. F25B 23/00 |
| | | | 429/120 |

FOREIGN PATENT DOCUMENTS

| | | |
|---|---|---|
| JP | H02276162 A | 11/1990 |
| WO | 2016025372 A1 | 2/2016 |

OTHER PUBLICATIONS

International Search Report and Written Opinion dated Oct. 4, 2017 in Int'l Application No. PCT/US2017/046203.

Joshi, Dr. Ashok V., "Thermoelectric Conversion with Ion Conductors," Final Report, Contract #N00014-86-C-0827, 40 pages (Jan. 1990).

Virkar et al., "Theoretical Assessment of an Oxygen Heat Engine: The Effect of Mass Transport Limitation," Energy Convers. Mgmt., vol. 32, No. 4, pp. 359-370 (1991).

Office Action dated Jul. 31, 2020 in U.S. Appl. No. 15/892,794, by Johnson.

Office Action dated Feb. 16, 2021 in U.S. Appl. No. 15/892,794, by Johnson.

* cited by examiner

THERMO-ELECTROCHEMICAL CONVERTER

CROSS-REFERENCE TO RELATED APPLICATION

This application is a section 371 of International Application No. PCT/US17/46203, filed Aug. 10, 2017, which was published on Feb. 15, 2018 under International Publication No. WO 2018/031713 A1, which claims the benefit of U.S. Provisional Application No. 62/374,252, filed Aug. 12, 2016, the disclosures of which are incorporated herein by reference.

BACKGROUND OF THE INVENTION

The conversion of heat energy or chemical energy to electrical energy, or visa-versa, may be accomplished in a variety of ways. For example, known electrochemical cells or batteries rely on chemical reactions wherein ions and electrons of a reactant being oxidized are transferred to the reactant being reduced via separate paths. Specifically, the electrons are transferred electrically via wiring through an external load where they perform work and the ions are conducted through an electrolyte separator.

However, battery type electrochemical cells can produce only a limited amount of energy because the confines of the battery casing limit the amount of available reactants that may be contained therein. Although such cells can be designed to be recharged by applying a reverse polarity current/voltage across the electrodes, such recharging requires a separate electrical source. Also, during the recharging process, the cell is typically not usable.

Fuel cells have been developed in an effort to overcome problems associated with battery type electrochemical cells. In conventional fuel cells, the chemical reactants are continuously supplied to and removed from the electrochemical cell. In a manner similar to batteries, fuel cells operate by conducting an ionized species through a selective electrolyte which generally blocks passage of electrons and non-ionized species.

The most common type of fuel cell is a hydrogen-oxygen fuel cell which passes hydrogen through one of the electrodes and oxygen through the other electrode. The hydrogen ions are conducted through the electrolyte separator to the oxygen side of the cell under the chemical reaction potential of the hydrogen and oxygen. Porous electrodes on either side of the electrolyte separator are used to couple the electrons involved in the chemical reaction to an external load via an external circuit. The electrons and hydrogen ions reconstitute hydrogen and complete the reaction, while the oxygen on the oxygen side of the cell results in the production of water which is expelled from the system. A continuous electrical current is maintained by a continuous supply of hydrogen and oxygen to the cell.

Mechanical heat engines have also been designed and used to produce electrical power. Such mechanical heat engines operate on thermodynamic cycles wherein shaft work is performed using a piston or turbine to compress a working fluid. The compression process is performed at a low temperature and, after compression, the working fluid is raised to a higher temperature. At the high temperature, the working fluid is allowed to expand against a load, such as a piston or turbine, thereby producing shaft work. A key to the operation of all engines employing a working fluid is that less work is required to compress the working fluid at low temperatures than that produced by expanding it at high temperatures. This is the case for all thermodynamic engines employing a working fluid.

For example, steam engines operate on the Rankine thermodynamic cycle, wherein water is pumped to a high pressure, and then heated to steam and expanded through a piston or turbine to perform work. Internal combustion engines operate on the Otto cycle, wherein low-temperature ambient air is compressed by a piston and then heated to very high temperatures via fuel combustion inside the cylinder. As the cycle continues, the expansion of the heated air against the piston produces more work than that consumed during the lower temperature compression process.

The Stirling engine has been developed to operate on the Stirling cycle in an effort to provide an engine that has high efficiency and offers greater versatility in the selection of the heat source. The ideal Stirling thermodynamic cycle is of equivalent efficiency to the ideal Carnot cycle, which defines the theoretical maximum efficiency of an engine operating on heat input at high temperatures and heat rejection at low temperatures. However, as with all mechanical engines, the Stirling engine suffers from reliability problems and efficiency losses associated with its mechanical moving parts.

In an effort to avoid the problems inherent with mechanical heat engines, Alkali Metal Thermo-Electrochemical Conversion (AMTEC) cells have been designed as a thermo-electrochemical heat engine. AMTEC heat engines utilize pressure to generate a voltage potential and electrical current by forcing an ionizable working fluid, such as sodium, through an electrochemical cell at high temperatures. The electrodes couple the electrical current to an external load. Electrical work is performed as the pressure differential across the electrolyte separator forces molten sodium atoms through the electrolyte. The sodium is ionized upon entering the electrolyte, thereby releasing electrons to the external circuit. On the other side of the electrolyte, the sodium ions recombine with the electrons to reconstitute sodium upon leaving the electrolyte, in much the same way as the process that occurs in battery and fuel cell type electrochemical cells. The reconstituted sodium, which is at a low pressure and a high temperature, leaves the electrochemical cell as an expanded gas. The gas is then cooled and condensed back to a liquid state. The resulting low-temperature liquid is then re-pressurized. Operation of an AMTEC engine approximates the Rankine thermodynamic cycle.

Numerous publications are available on AMTEC technology. See, for example, *Conceptual design of AMTEC demonstrative system for* 100 *t/d garbage disposal power generating facility*, Qiuya Ni et al. (Chinese Academy of Sciences, Inst. of Electrical Engineering, Beijing, China). Another representative publication is *Intersociety Energy Conversion Engineering Conference and Exhibit* (IECEC), 35th, Las Vegas, Nev. (July 24-28, 2000), Collection of Technical Papers. Vol. 2 (A00-37701 10-44). Also see American Institute of Aeronautics and Astronautics, 190, p. 1295-1299. REPORT NUMBER(S)—AIAA Paper 2000-3032.

AMTEC heat engines suffer from reliability issues due to the highly corrosive nature of the alkali metal working fluid. AMTEC engines also have very limited utility. Specifically, AMTEC engines can only be operated at very high temperatures because ionic conductive solid electrolytes achieve practical conductivity levels only at high temperatures. Indeed, even the low-temperature pressurization process must occur at a relatively high temperature, because the alkali metal working fluid must remain above its melt temperature at all times as it moves through the cycle.

Mechanical pumps and even magneto-hydrodynamic pumps have been used to pressurize the low-temperature working fluid.

In an effort to overcome the above-described drawbacks of conventional mechanical and thermo-electrochemical heat engines, the Johnson Thermo-Electrochemical Converter (JTEC) system (disclosed in U.S. Pat. No. 7,160,639 filed Apr. 28, 2003) was developed. The typical JTEC system is a heat engine that includes a first electrochemical cell operating at a relatively low temperature, a second electrochemical cell operating at a relatively high temperature, a conduit system including a heat exchanger that couples the two cells together, and a supply of ionizable gas (such as hydrogen or oxygen) as a working fluid contained within the conduit system. Each electrochemical cell includes a Membrane Electrode Assembly (MEA).

More particularly, the JTEC heat engine includes a first MEA stack coupled to a high temperature heat source $Q_H$ (i.e., a high temperature MEA), a second MEA stack coupled to a low temperature heat sink $Q_L$ (i.e., a low temperature MEA), and a recuperative heat exchanger connecting the two MEA stacks. Each MEA stack includes a non-porous membrane capable of conducting ions of the working fluid and porous electrodes positioned on opposite sides of the non-porous membrane that are capable of conducting electrons.

During operation of the JTEC, the working fluid passes through each MEA stack by releasing an electron to the electrode on the entering side, such that the ion can be conducted through the membrane to the opposite electrode. The working fluid is reconstituted within the opposite electrode as it re-supplies electrons to working fluid ions as they exit the membrane.

The low temperature MEA stack operates at a lower voltage than the high temperature MEA stack. The low temperature MEA stack compresses the working fluid (hydrogen) at low voltage and the high temperature MEA stack expands hydrogen at high voltage. The difference in voltage between the two MEA stacks is applied across the external load. The hydrogen circulates continuously inside the JTEC heat engine and is never consumed. The current flow through the two MEA stacks and the external load is the same.

Specifically, in the JTEC heat engine, a hydrogen pressure differential is applied across each MEA stack with a load attached, thereby producing a voltage and current as hydrogen passes from high pressure to low pressure. The electron current is directed to the external load as electrons are stripped from the protons as they pass through the membrane, which is a proton conductive membrane (PCM). The JTEC system utilizes the electrochemical potential of hydrogen pressure applied across the PCM. More particularly, on the high pressure side of MEA stack and the low pressure side of MEA stack, hydrogen gas is oxidized resulting in the creation of protons and electrons. The pressure differential at the high temperature end forces the protons through the membrane causing the electrodes to conduct electrons through an external load, while the imposition of an external voltage forces protons through the membrane at the low temperature end. On the high pressure side of MEA stack and the low pressure side of MEA stack, the protons are reduced with the electrons to reform hydrogen gas.

Unlike conventional fuel cells, in which the hydrogen exiting the MEA stack would encounter oxygen and react with it producing water, there is no oxygen or water in the JTEC system. This process can also operate in reverse. Specifically, if current is passed through the MEA stack, a low-pressure gas can be "pumped" to a higher pressure. The reverse process is rather similar to that of using a MEA stack to electrolyze water, wherein water molecules are split and protons are conducted through the PCM, leaving oxygen behind on the water side. Hydrogen is often supplied at a high pressure to a pure hydrogen reservoir via this process.

In the JTEC, using hydrogen as the ionizable gas (i.e., the working fluid), the electrical potential due to a hydrogen pressure differential across the PCM is proportional to the natural logarithm of the pressure ratio, and can be calculated using the Nernst equation:

$$V_{OC} = \frac{RT}{2F} \ln(P_H/P_L), \qquad \text{Equation 1}$$

where $V_{OC}$ is open circuit voltage, R is the universal gas constant, T is the cell temperature, F is Faraday's constant, $P_H$ is the pressure on the high pressure side, $P_L$ is the pressure on the low pressure side, and $P_H/P_L$ is the pressure ratio. E.g., *Fuel Cell Handbook*, J. H. Hirschenhofer et al., $4^{th}$ Edition, p. 2-5 (1999).

The voltage generated by the second MEA stack is thus given by the Nernst equation. The voltage is linear with respect to temperature and is a logarithmic function of the pressure ratio.

The working fluid in the JTEC is compressed in the low temperature electrochemical cell by supplying current at a voltage that is sufficient to overcome the Nernst potential of the low temperature cell, thereby driving hydrogen from the low pressure side of the membrane to the high pressure side. On the other hand, the working fluid is expanded in the high temperature electrochemical cell as current (power) is extracted under the Nernst potential of the high temperature cell. Electrical current flow is generated as hydrogen expands from the high pressure side of the membrane to the low pressure side. As in any thermodynamic engine employing a working fluid and consistent with the nature of compressible gas, in the JTEC, a greater amount of work (electricity) is extracted during high temperature expansion than the work (electricity) input required for the low temperature compression. The difference in heat energy input to the engine to maintain constant temperature during high temperature expansion versus the heat energy removed to maintain constant temperature during low temperature compression is provided as the difference in electrical energy output by the high temperature expansion process versus that consumed by the low temperature compression process.

Consistent with the Nernst equation, the high temperature cell will have a higher voltage than the low temperature cell. Since the current (I) is the same through both cells, the voltage differential means that the power generated through the expansion of hydrogen in the high temperature cell is higher than that of the low temperature cell. The power output by the high temperature cell ($V_{HT}*I$) is sufficient to drive the compression process in the low temperature cell ($V_{LT}*I$) as well as supply net power output to an external load (($V_{HT}*I$)−(VLT*I)). This voltage differential provides the basis for the JTEC engine.

Operation of the JTEC is generally similar to any other engine. For example, in a typical jet engine, the compressor stage pulls in air, compresses the air, and supplies the compressed air to the combustion chamber. The air is then heated in the combustion chamber and expands through the power stage. The power stage couples shaft work back to the compressor stage, in order to maintain a continuous supply of compressed air. The difference in work generated by the power stage and that consumed by the compressor stage is the net work output by the engine. However, the primary difference between such conventional engines and the JTEC is that such conventional engines utilize a turbine (i.e., a mechanical device) and operate on the Brayton thermodynamic cycle, whereas the JTEC is an all solid-state engine that operates on the more efficient Ericsson cycle, which is equivalent to the Carnot cycle.

However, some challenges have been encountered with developing a JTEC that is suitable for widespread use, particularly for systems that use hydrogen as the working fluid. For example, hydrogen leakage through small defects in the conduit system may occur due to the small size of the hydrogen molecule. In particular, hydrogen leakage can occur at the joints of the interconnects for the conduit couplings between the high-temperature cell and the low-temperature cell.

The engine design is also complicated by the need for a large membrane/electrode surface area and by the need for a significant number of cells to be electrically connected in series to achieve practical output voltage levels. Specifically, unlike conventional fuel cells, where the open circuit voltage can be greater than 1V, the Nernst voltage from the hydrogen pressure differential across a MEA stack is in the range of only about 0.2 Volts. As such, many cells will have to be connected in series to achieve useful output voltage levels.

Further, in order to achieve efficient energy conversion, the membranes must have high diffusion barrier properties, because diffusion of working fluid (such as hydrogen gas) under the pressure differential across the membrane results in reduced electrical output and efficiency. The membranes utilized must also have good ion conductivity. However, known and available membrane materials that have good ion conductivity, such as Nafion, a polymer manufactured by the DuPont Corp., generally have very poor molecular diffusion barrier properties. Conversely, known and available membrane materials that have high molecular diffusion barrier properties generally have relatively low ionic conductivity, and use of such materials would result is high system impedance and high polarization losses.

Accordingly, there is a need for a practical way of using available high barrier, low conductivity membrane materials to provide a thermo-electrochemical heat engine that can approximate a Carnot equivalent cycle, that can operate over a wide range of heat source temperatures, and that eliminates the reliability and inefficiency problems associated with mechanical engines. The heat engine of the present invention fulfills this need.

BRIEF SUMMARY OF THE INVENTION

One embodiment of the present invention relates to a MEA stack or electrochemical cell configured to produce voltage potentials from an ionizable working fluid concentration differential. The membranes are conductive of ions of the working fluid. The electrodes include additives to promote electronic conductivity and a catalyst to promote the desired electrochemical reactions.

The electrochemical cells or MEA stacks of the present invention preferably operate on concentration differentials. They produce relatively low voltage in comparison to fuel cells which produce voltage based on fuel and oxidizer chemical reaction potentials.

In operation, working fluid enters an MEA stack through one of the porous electrodes and releases electrons to that electrode as its ions enter and are conducted through the membrane. The electrons are routed through an external circuit to the other electrode on the opposite side of the membrane. The ions are conducted through the membrane and exit the electrode on the opposite side. The working fluid is reconstituted as its ions exit the membrane and recombine with the electrons. The thin electrodes and membranes are stacked at high density in alternating sequence with each other, such that adjacent MEA stacks share a common electrode. More particularly, the high density MEA stacks of the present invention are preferably configured such that each membrane is sandwiched by a pair of electrodes, with one of the electrodes of the pair being positioned on the high pressure side of the membrane and the other electrode of the pair being positioned on the low pressure side of the membrane.

In another embodiment, the present invention relates to a thermo-electrochemical converter, preferably configured as a JTEC, direct heat to electricity engine containing an ionizable working fluid that circulates within a continuous flow loop between the two MEA stacks within a system of high and low pressure conduits. The first MEA stack is preferably connected to a heat source and functions to expand the working fluid from a high pressure to a low pressure. The expansion of the working fluid through the first MEA stack generates electricity. The second MEA stack is preferably connected to a heat sink and functions to pump the working fluid from a low pressure to a high pressure. Electrical power is consumed by the compression process and the heat of compression is rejected.

In one embodiment, wherein the MEA stacks operate as part of an engine, the heat source to which the first MEA stack is coupled is preferably at an elevated temperature relative to the temperature of the heat sink to which the second MEA stack is coupled. As such, the higher temperature MEA stack (i.e., the first MEA stack) has a higher Nernst voltage than the lower temperature stack (i.e., the second MEA stack). The voltage generated by the high temperature MEA stack is high enough to overcome the Nernst voltage of the low temperature MEA stack and have sufficient voltage left over to power an external load connected in series.

In another embodiment, in which the MEA stacks operate as part of a heat pump application, the first MEA stack is preferably coupled to a heat source that is at a reduced temperature and the second MEA stack is preferably coupled to a heat sink that is at an elevated temperature relative to the heat source of the first MEA stack. Working fluid is expanded at a low temperature in the first MEA stack as the heat of expansion is extracted from the low temperature heat source. Working fluid is compressed at a high temperature in the second MEA stack, and the heat of compression is rejected at the elevated temperature. Because of the low temperature of the first MEA stack, the first MEA stack produces a Nernst voltage that is less than that of the high temperature MEA stack. An external power source is connected in series with the low temperature MEA stack in order to provide a combined voltage that is high enough to overcome the Nernst potential of the high temperature MEA stack and thereby drive the compression process therein.

The heat engine preferably further comprises a conduit system including at least one high pressure flow channel, and more preferably a plurality of high pressure flow channels, which couple the flow of the working fluid between high pressure electrodes of the first MEA stack to high pressure electrodes of the second MEA stack, such that the connected high pressure electrodes are essentially at the same pressure. The conduit system preferably further includes at least one low pressure flow channel, and more preferably a plurality of low pressure flow channels, which couple the flow of the working fluid between the low pressure electrodes of the first MEA stack to the low pressure electrodes of the second MEA stack, such that the connected low pressure electrodes are essentially at the same pressure. The high pressure electrodes within each MEA stack are preferably electrically connected to each other. Similarly, the low pressure electrodes within each MEA stack are preferably electrically connected to each other. As such, the electrically connected MEA stacks function as a single membrane electrode assembly having a large area and a Nernst voltage that is a function of the stacks' temperature and the pressure differential across the membranes.

The heat exchanger of the heat engine preferably functions as a recuperative heat exchanger to recuperate heat from working fluid leaving the high temperature MEA stack by coupling it to working fluid flowing to the high temperature MEA stack. Providing such a recuperative heat exchanger in combination with a heat source and heat sink coupled to the high and low temperature electrochemical cells (i.e., MEA stacks) enables sufficient heat transfer for near constant temperature expansion and compression processes, thereby allowing the engine to approximate the thermodynamic Ericsson cycle.

BRIEF DESCRIPTION OF THE SEVERAL VIEWS OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings.

DETAILED DESCRIPTION OF THE INVENTION

Figure 1:
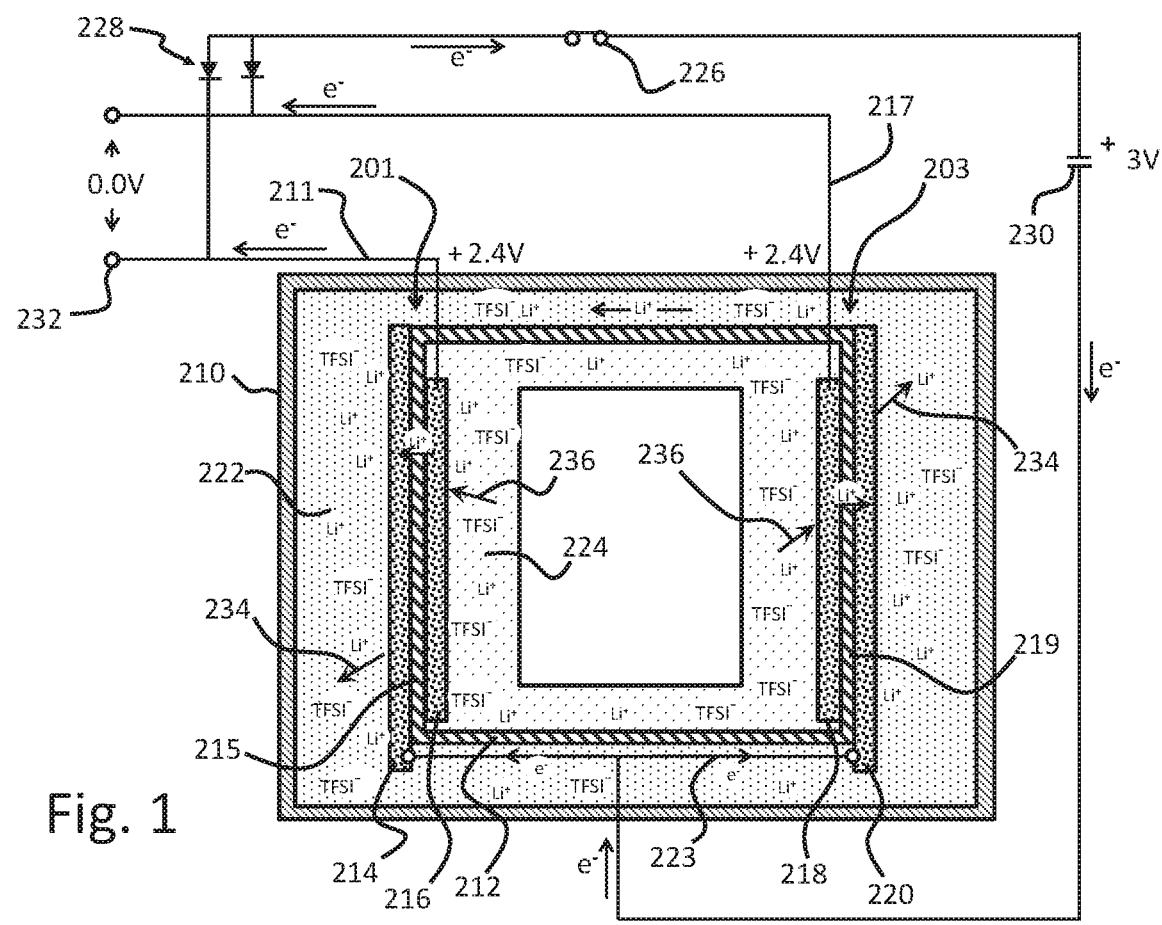
FIG. 1 is a diagram showing operation of a JTEC that utilizes a ionizable working fluid dissolved in a solvent at different concentration levels to produce a voltage differential, in accordance with an embodiment of the present invention.

Certain terminology is used in the following description for convenience only and is not limiting. The words "proximal," "distal," "upward," "downward," "bottom" and "top" designate directions in the drawings to which reference is made. The words "inwardly" and "outwardly" refer to directions toward and away from, respectively, a geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

It will also be understood that terms such as "first," "second," and the like are provided only for purposes of clarity. The elements or components identified by these terms, and the operations thereof, may easily be switched.

Referring to the drawings in detail, wherein like numerals indicate like elements throughout the several views, FIGS. 1-2 and 3-10 show preferred embodiments of a heat engine including one or more MEA stacks. The terms "electrochemical cell," "membrane electrode assembly stack," "MEA stack," "MEA cell" and "stack" are used interchangeably herein.

In one embodiment, the entire MEA stack is preferably formed of a material comprising a compound represented by the general formula $Na_x Al_y Ti^{3+}_{x-y} Ti^{4+}_{8-x} O_{16}$, as disclosed in U.S. Pat. No. 4,927,793 of Hori et al., which is incorporated herein by reference, since this material exhibits high proton conductivity over a broad temperature range. However, it will be understood by those skilled in the art that any material, and preferably any polymer or ceramic material, which demonstrates a similar proton conductivity over a broad temperature range may be used to form the MEA stack. For example, in an alternate embodiment, the MEA stack is formed of hydronium beta alumina. The polymer or ceramic material preferably forms a high barrier to molecular working fluid flow and provides for effective containment of the working fluid.

Referring to FIG. 1, there is shown a heat engine that uses lithium as an ionizable working fluid dissolved in a solvent. Specifically, anhydrous organic amines form the solvent which dissolve the alkali metal working fluid. For example, pentyl amine, pyridine, HMPO, isopropylamine, triethylamine, triethyltetramine, ethylenediamine or anhydrous ammonia can dissolve the lithium. Housing 210 encloses the active components of the converter. A first MEA cell 201 is formed by a first electrode 216, a second electrode 214, and a first solid electrolyte wall 215 sandwiched between the first and second electrodes 216, 214. The first MEA cell 201 is provided on one side of the housing 210. On an opposing side of the housing 201, a second MEA cell 203 is formed by a first electrode 218, a second electrode 220, and a second solid electrolyte wall 219 sandwiched between the first and second electrodes 281, 220. The first and second solid electrolyte walls 215, 219 are part of a solid electrolyte enclosure 212.

The first and second MEA cells 201, 203 are surrounded or encompassed by a first solvent solution 222. More particularly, the second electrodes 214, 220 of the first and second MEA cells 201, 203 are contained within the housing 210 and surrounded by the first solvent solution 222. The solid electrolyte enclosure 212, in turn, encloses a second solvent solution 224 and the first electrodes 216, 218 of the first and second MEA cells 201, 203.

A conductor 223 electrically connects the second electrodes 214, 220 of the first and second MEA cells 201, 203 to each other and to the negative terminal of a start-up charging power source 230. A switch 226 connects the positive terminal of the start-up power source 230 to the first electrodes 216, 218 of the first and second MEA cells 201, 203 through isolation diodes 228. Both of the first and second solvent solutions 222 and 224 contain dissolved lithium. Accordingly, the start-up power source 230 supplies the current needed to oxidize lithium within the first electrodes 216, 218 of the first and second MEA cells 201, 203. The resulting lithium ions are then conducted through the solid electrolyte 212, reduced in the second electrode 214 of the first MEA cell 201 and the second electrode 220 of the second MEA cell 203, respectively, and subsequently diffused into the first solvent solution 222, as indicated by arrows 234 in FIG. 1. The extraction of lithium through the solid electrolyte 212 results in a concentration gradient that causes dissolved lithium to diffuse to the first electrode 216 of the first MEA cell 201 and the first electrode 218 of the second MEA cell 203, as indicated by arrows 236 in FIG. 1.

For example, taking an arbitrarily selected 3-volt start-up power source 230 and allowing for a 0.6 volt drop across the isolation diodes 228, the concentration levels of lithium in the first and second solvent solutions 222, 224 are thus driven to a voltage potential across the first and second MEA cells 201, 203 of 2.4 volts each, at which point current flow terminates. As shown in FIG. 1, first and second leads 211 and 217 connect the first electrode 216 of the first MEA cell 201 and the first electrode 218 of the second MEA cell 203, respectively, to a terminal 232.

Figure 2:
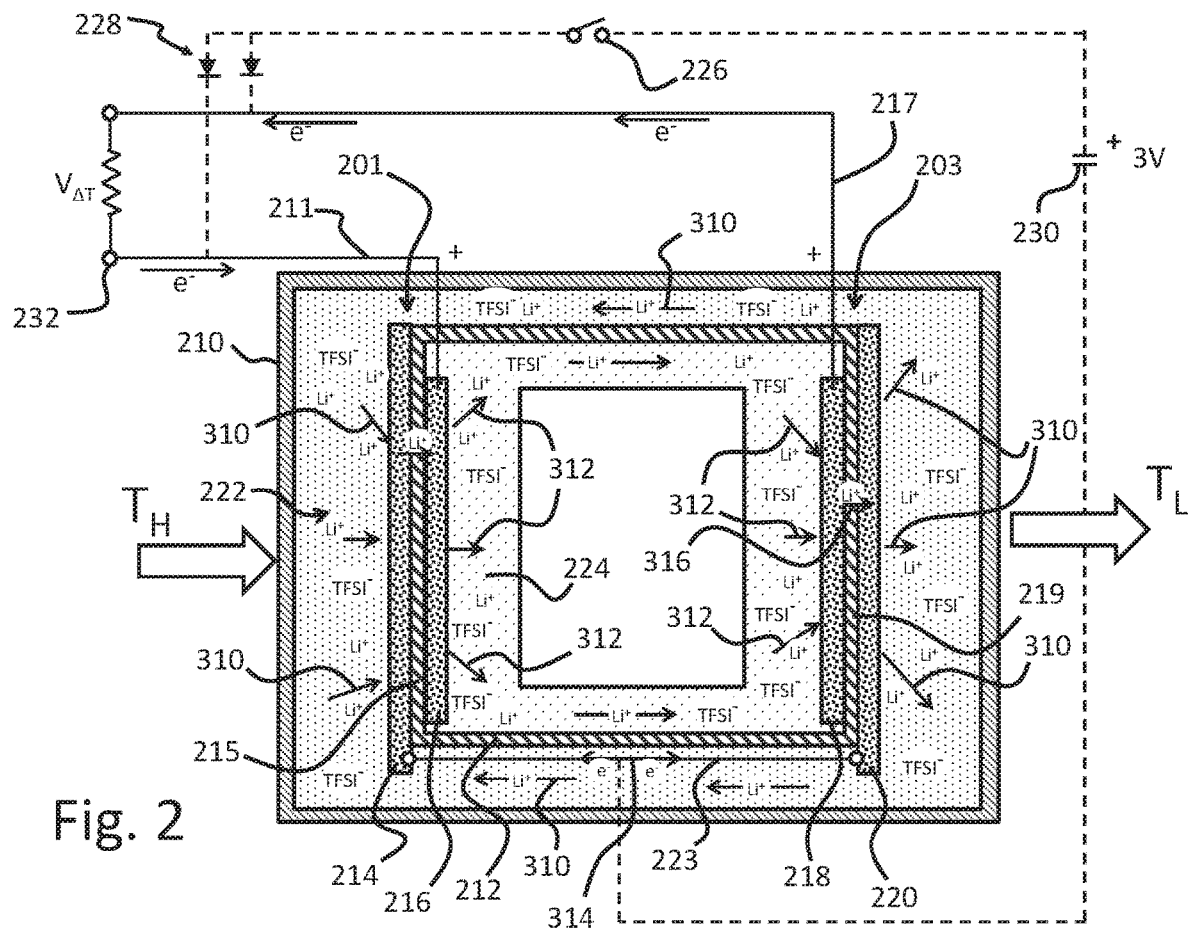
FIG. 2 is diagram of a JTEC that utilizes a ionizable working fluid dissolved in a solvent at different concentration levels to produce a voltage differential, in accordance with an embodiment of the present invention.

Referring to FIG. 2, there is shown the operation of the dissolved lithium concentration cell with heat input, from heat input at temperature $T_H$ and heat rejection to a heat sink at temperature $T_L$. With the switch 226 open, the start-up power source 230 is removed from the circuit. Under this condition, the first and second MEA cells 201, 203 produce power at a voltage $V_{AT}$ across a load at terminal 232. Voltage $V_{AT}$ is determined by the voltage difference between the first MEA 201 and the second MEA 203, which is determined by their temperature difference, $T_H$ and $T_L$, respectively. For a positive electrochemical temperature coefficient and $T_H$ greater than $T_L$, the voltage of the first MEA cell 201 will be higher than that of the second MEA cell 203. The higher voltage of the first MEA cell 201 enables the first MEA cell 201 to discharge itself by conducting ions from the high concentration, second electrode 214 of the first MEA cell 201 through the electrolyte plane 215 to the low concentration, first electrode 216 of the first MEA cell 201, thus driving a reverse current through the lower voltage, second MEA cell 203. The reverse current flow through the second MEA cell 203 causes the second MEA cell 203 to pump an equivalent current of lithium ion flow from the low concentration, second solvent solution 224 via the first electrode 218 of the second MEA cell 203 back to the high concentration, first solvent solution 222 via the second electrode 220 of the second MEA cell 203, as represented by arrow 316 in FIG. 2. Dissolved lithium enters the high concentration, second electrode 214 of the first MEA cell 201 from the second electrode 220 of the second MEA cell 203 by diffusion through the first solvent solution 222, as indicated by arrows 310 in FIG. 2. Lithium enters the first electrode 218 of the second MEA cell 203 from the first electrode 216 of the first MEA cell 201 by diffusion through the low concentration, second solvent solution 224, as indicated by arrows 312 in FIG. 2, in order to maintain continuous current flow. Operation of the cell is such that the concentration levels within the two solvent solutions 222, 224 remains constant and the difference in voltage between the two MEA cells 201, 203 is applied across the load at the terminal 232 less resistive losses. It is understood that the start-up power source 230 is not needed if the solvent solutions 222, 224 are initially placed in the cells with a level of ion concentration in each. The electrical conductor 223 enables electron flow 314 between the second electrodes 214, 220 of the first and second MEA cells 201, 203.

Figure 3:
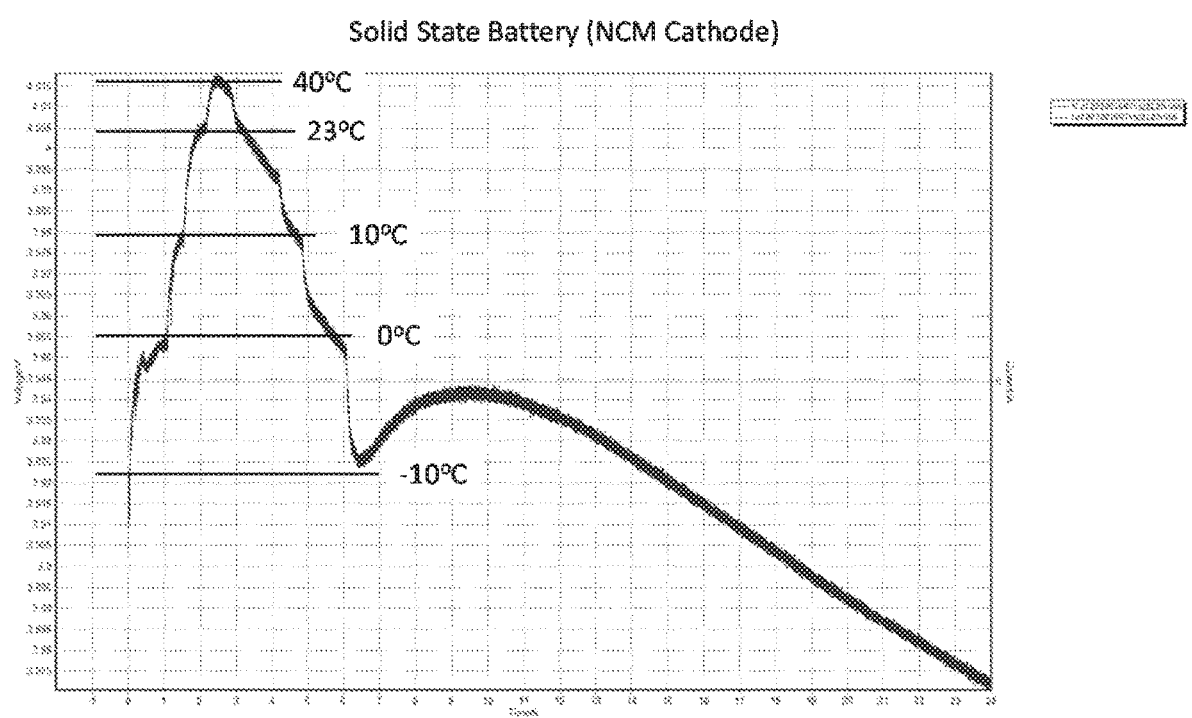
FIG. 3 is a plot of voltage versus temperature for an exemplary electrochemically active material.

Referring to FIG. 3, there is shown is a graph showing voltage vs. temperature for an example working fluid active material. More particularly, the graph is for a cell having Nickel Cobalt Manganese Oxide ($N_{0.3}Co_{0.3}Mn_{0.3}O_2$ or NCM) as an active cathode material. The cell is charged to 4.005 volts. From the data shown in FIG. 3, the temperature voltage coefficient for the cell is 2.4 mV/° C. Accordingly, FIG. 3 establishes that NCM is a suitable material for use as an active electrode material within embodiments of the present invention.

Figure 4:
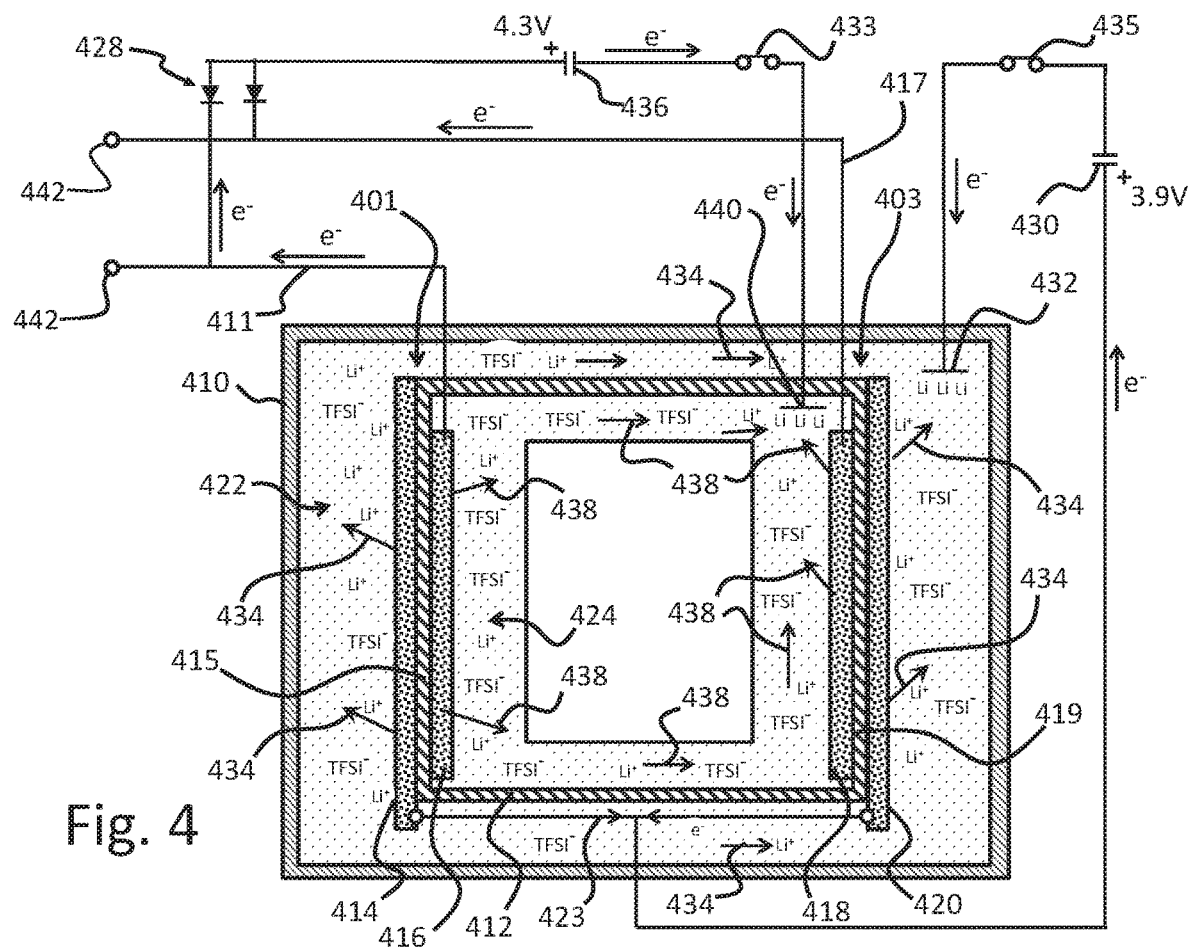
FIG. 4 is a diagram of a JTEC that utilizes a MEA having electrochemically active electrodes coupled to each other by an ion conductive electrolyte, showing charging of the electrodes, in accordance with an embodiment of the present invention.

Referring now to FIG. 4, there is shown another embodiment of a converter according to the present invention. A housing 410 encloses first and second MEA cells 401 and 403 arranged in a back-to-back configuration. The converter employs lithium as a working fluid and a lithium ion conductive electrolyte. The first MEA cell 401 is formed by a first electrode 416, a second electrode 414, and a first solid electrolyte wall 415 sandwiched between the first and second electrodes 416, 414, on one side of the converter. On the other side of the converter, the second MEA cell 403 is formed by a first electrode 418, a second 420, and a second solid electrolyte wall 419 sandwiched between the first and second electrodes 418, 420.

Housing 210 encloses the active components of the converter. The first and second solid electrolyte walls 415, 419 are part of a solid electrolyte enclosure 412. The first and second MEA cells 401, 403 are surrounded or encompassed by a first electrolyte solution 222. More particularly, the second electrodes 414, 420 of the first and second MEA cells 401, 403 are contained within the housing 410 and surrounded by the first electrolyte solution 422. The solid electrolyte enclosure 412, in turn, encloses a second electrolyte solution 424 and the first electrodes 416, 418 of the first and second MEA cells 401, 403.

Conductor 423 electrically connects the second electrodes 414, 420 of the first and second MEA cells 401, 403 to each other and to the positive terminal of a start-up charging power source 430. A switch 435 connects the negative terminal of the start-up power source 430 to a charge plating surface 432. With the switch 435 closed, the start-up power source 430 supplies the current needed to extract lithium from the lithium intercalation material comprising the active second electrodes 414, 420 of the first and second MEA cells 401, 403. As indicated by the arrows 434 in FIG. 4, the extracted lithium is conducted by the first electrolyte solution 422 to the charge plating surface 432 where the extracted lithium is reduced and plated.

Similarly, a switch 433 connects the positive terminal of a start-up power source 436 to the first electrodes 416, 418 of the first and second MEA cells 401, 403 through isolation diodes 428. The negative terminal of the power source 436 is coupled to a charge plating surface 440 by the switch 433. With the switch 433 closed, the start-up power source 436 supplies the current needed to extract lithium from the lithium intercalation material comprising the active first electrodes 416, 418 of the first and second MEA cells 401, 403. As indicated by arrows 438 in FIG. 4, the extracted lithium is conducted by the second electrolyte solution 424 to the charge plating surface 440 where the extracted lithium is reduced and plated. The first electrodes 416, 418 of the first and second MEA cells 401, 403 are coupled by electrical conductors 411 and 417, respectively, to terminals 442.

Figure 5:
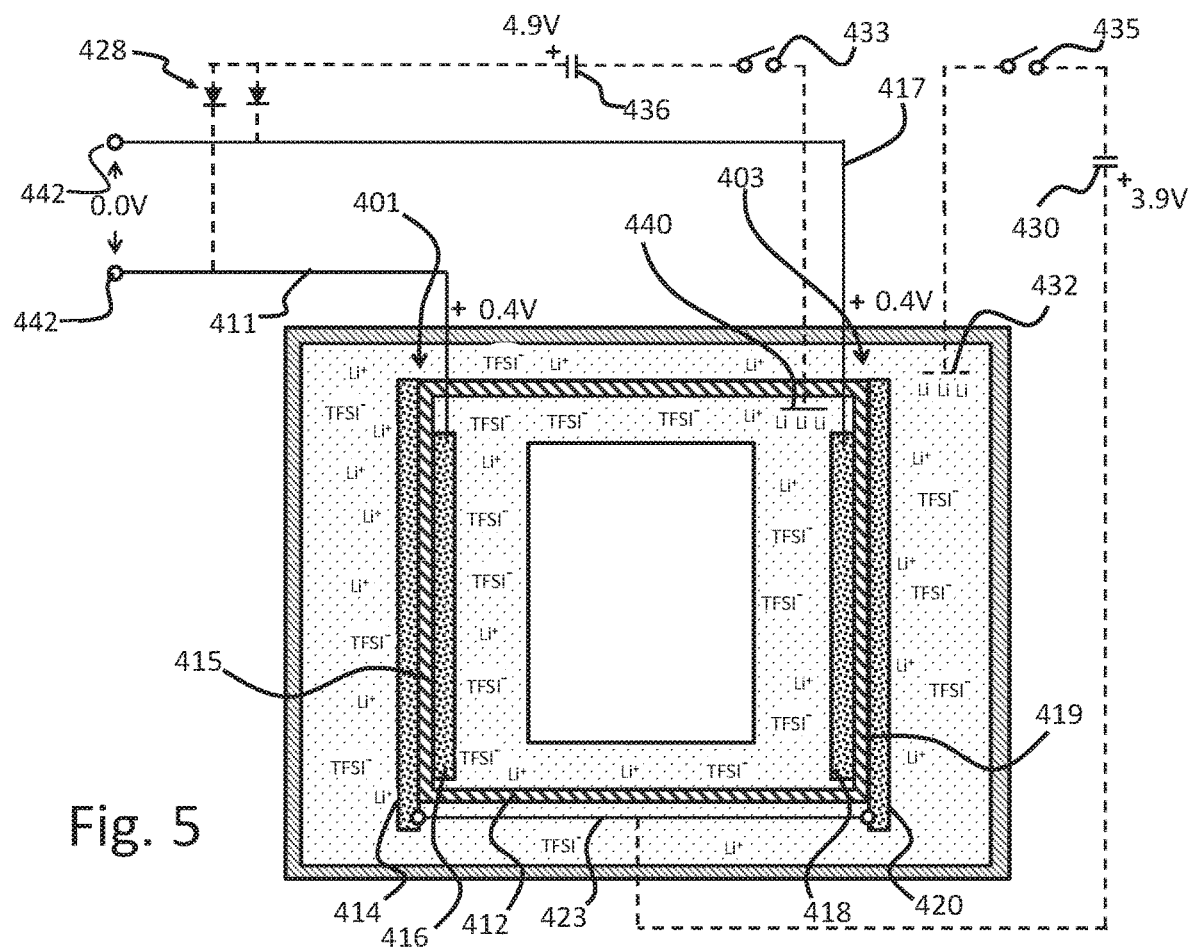
FIG. 5 is a diagram of a JTEC that utilizes a MEA having electrochemically active electrodes coupled to each other by an ion conductive electrolyte, showing a selected state after charging, in accordance with an embodiment of the present invention.

Referring to FIG. 5, there is shown a state of the converter after charging. The start-up power source 436 at 4.9 volts charges the first electrodes 416, 418 of the first and second MEA cells 401, 403 to a low concentration voltage of 4.3 volts, accounting for the approximately 0.6 volt drop across the isolation diodes 428. With the start-up power source 430 charging the second electrodes 414, 420 of the first and second MEA cells 401, 403 at a high concentration voltage of 3.9 volts, a 0.4 volt voltage differential is produced across the electrodes of each of the first and second MEA cells 401, 403. With the electrical conductors 411, 417 both being at a potential of 0.4 volts, the net voltage applied across the terminals 442 is 0 volts. With both switches 433 and 435 being open, the start-up charging power source 430 and 433 are removed from the circuit.

Figure 6:
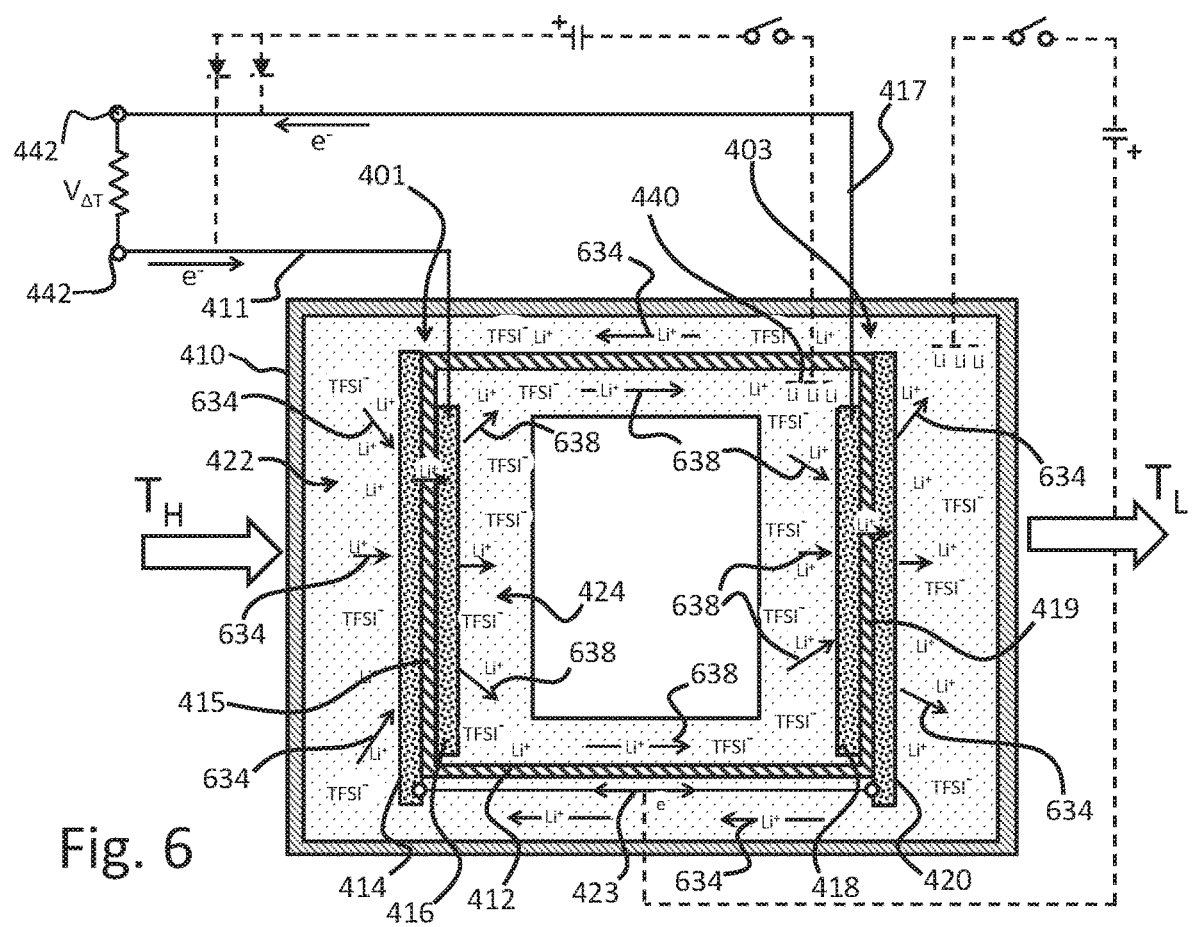
FIG. 6 is a diagram of a JTEC that utilizes a MEA having electrochemically active electrodes coupled to each other by an ion conductive electrolyte, showing operation on heat to produce power, in accordance with an embodiment of the present invention.

FIG. 6 represents the operation of the converter under an applied temperature differential. The voltage $V_{AT}$ across a load at terminals 442 is determined by the voltage difference between the first MEA cell 401 and the second MEA cell 403 which, in turn, is determined by their relative temperatures. Heat is input to the first MEA cell 401 at an elevated temperature of $T_H$ and heat is extracted from the second MEA cell 403 at a lower temperature of $T_L$, whereby voltage differential $V_{AT}$ is created. For a positive electrochemical temperature coefficient, the voltage of the first MEA cell 401 will be higher than that of the second MEA cell 403. The higher voltage of the first MEA cell 401 enables the first MEA cell 401 to discharge itself by conducting ions from the high concentration, second electrode 414 through the electrolyte plane 415 to the low concentration, first electrode 416, as reflected by arrows 634 in FIG. 6, thus driving a reverse current through the lower voltage second MEA cell 403. Lithium enters the first electrode 418 of the second MEA cell 403 from the first electrode 416 of the first MEA cell 401 by diffusion through the low concentration, second electrolyte solution 424, as indicated by arrows 638 in FIG. 6, in order to maintain continuous current flow. The reverse current flow through the second MEA cell 403 causes the second MEA cell 403 to pump an equivalent current of lithium ion flow from low concentration electrode 418 through electrolyte 419 to high concentration electrode 420. The second electrodes 414, 420 of the first and second MEA cells 401, 403 are electrically connected to each other by lead 423 so that they remain at equal voltage potential. Because of their equal potential, lithium is conducted by the first electrolyte solution 422 from the second electrode 420 of the second MEA cell 403 to the second electrode 414 of the first MEA cell 401, as lithium enters the second electrode 420 of the second MEA cell 403 as an imbalance in lithium content would require an imbalance in voltage potential. It is understood that the start-up power sources 430 and 436 are not needed if the electrodes are initially placed in the cells at a desired operating potential differential, either by lithium content or by choice of lithium active materials.

Figure 7:
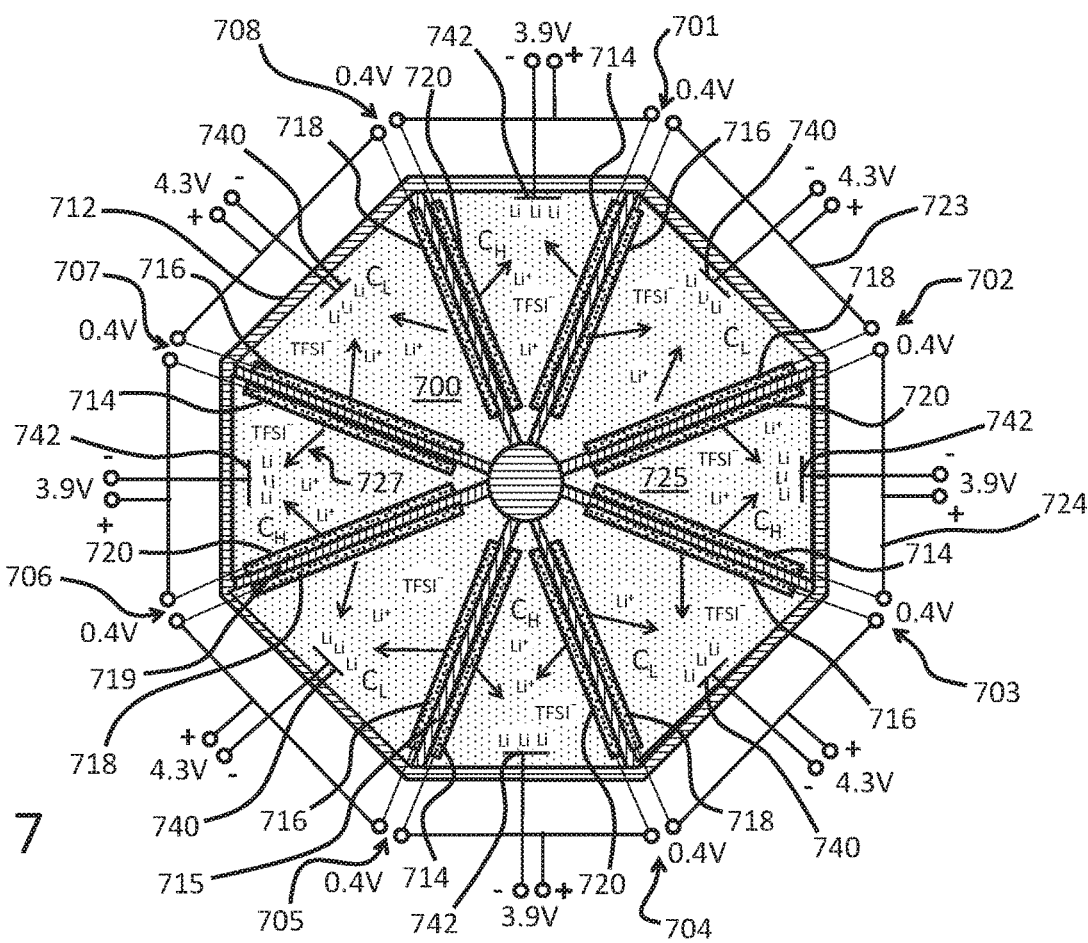
FIG. 7 is a diagram of a JTEC in a multi-MEA toroidal configuration that uses electrochemically active electrodes coupled to each other by an ion conductive electrolyte, showing charging of the active electrode material, in accordance with an embodiment of the present invention.

Referring to FIG. 7, there is shown an embodiment of the present invention wherein a plurality of MEA cells are arranged in a toroidal configuration, and wherein the relative distance between electrodes is minimized in order to minimize the impedance associated with conduction by the electrolyte between each MEA cell. The converter is contained by housing 712. In the illustrated embodiment, there are eight MEA cells 701, 702, 703, 704, 705, 706, 707 and 708 configured sequentially back to back as a toroidal structure. Each MEA cell 701, 703, 705, 707 of a first set of the MEA cells includes a first electrode 714, a second electrode 716 and an electrolyte separator 715 disposed between the first and second electrodes 714, 716. Each MEA cell 702, 704, 706, 708 of a second set of the MEA cells includes a first electrode 718, a second electrode 720 and a separator 719 positioned between the first and second electrodes 718, 720. The individual MEA cells 701, 703, 705, 707 of the first set are arranged in an alternating configuration relative to the individual MEA cells 702, 704, 706, 708 of the second set.

In a first set of sections of the toroidal structure, an electrolyte 700 ion conductively couples the second electrode 716 of each of the first set of MEA cells 701, 703, 705, 707, the first electrode 718 of each of the second set of MEA cells 702, 704, 706, 708, and charge plating surfaces 740 to each other. In a second set of sections of the toroidal structure, an electrolyte 725 ion conductively couples the first electrode 714 of each of the first set of MEA cells 701, 703, 705, 707, the second electrode 720 of each of the second set of MEA cells 702, 704, 706, 708, and charge plating surfaces 742 to each other. The electrolytes 700 and 725 may have the same composition, depending on the operating voltage and composition of the first electrode 714 of the first set of MEA cells 701, 703, 705, 707 and the second electrode 720 of the second set of MEA cells 702, 704, 706, 708 relative to the second electrodes 716 of the first set of MEA cells 701, 703, 705, 707 and the first electrode 718 of the second set of MEA cells 702, 704, 706, 708. Leads 723 connect each second electrode 716 of the first set of MEA cells 701, 703, 705, 707 to each first electrode 718 of the second set of MEA cells 702, 704, 706, 708 at each section (see +4.3V connection lines) and leads 724 connect each first electrode 714 of the first set of MEA cells 701, 703, 705, 707 to each second electrode 720 of the second set of MEA cells 702, 704, 706, 708 at each section (see +3.9V connection lines).

In the example shown in FIG. 7, a start-up charge voltage of 3.9 volts is applied to the first electrodes 714 of the first set of MEA cells 701, 703, 705, 707 and the second electrodes 720 of the second set of MEA cells 702, 704, 706, 708 relative to charge plating surface 742. Similarly, a start-up charge voltage of 4.3 volts is applied to the second electrodes 716 of the first set of MEA cells 701, 703, 705, 707 and the first electrodes 718 of the second set of MEA cells 702, 704, 706, 708 relative to charge plating surface 740. As indicated by arrows 727, the charging process extracts lithium from the active material of the connected electrodes 714, 720 and 716, 718 and plates it onto the charge plating surfaces 742, 740, respectively. At a charge voltage of 3.9 volts, the connected electrodes 714, 720 are charged at a high lithium concentration level relative the lower concentration level of the connected electrodes 716, 718 charged at 4.3 volts.

Figure 8:
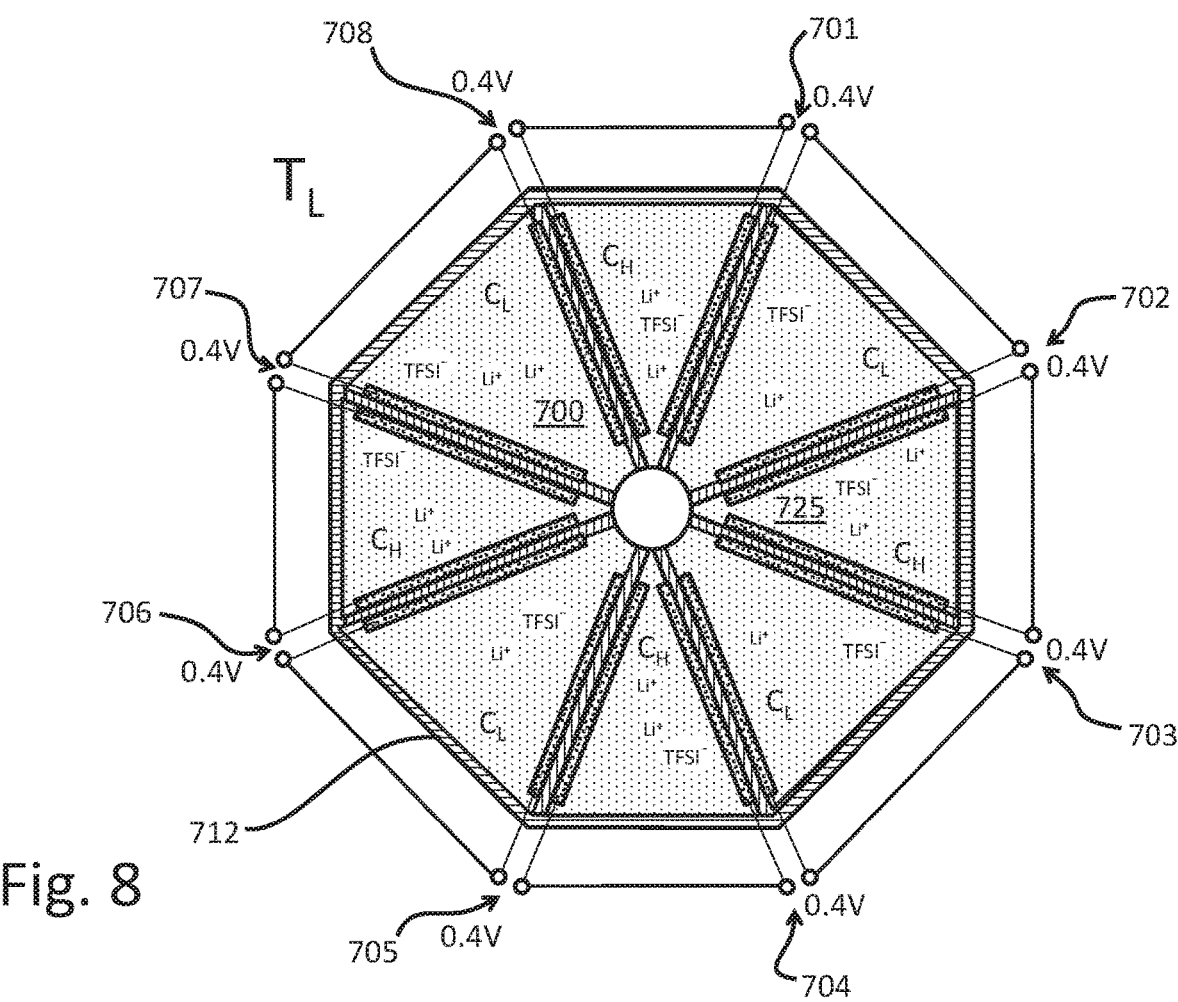
FIG. 8 is a diagram of a JTEC in a multi-MEA toroidal configuration that uses electrochemically active electrodes coupled to each other by an ion conductive electrolyte showing voltage at a state of charge of the active material.

For ease of understanding, FIG. 8 shows the equilibrium state of the MEA set at a nominal temperature of $T_L$ after charging and disconnection of the start-up charge sources. The charge plating surfaces may or may not actually be physically removed. The resulting reaction potential difference of 0.4V across each MEA cell 701-708 is reflective of the low charge reaction potential of the 3.9V electrode and versus the high charge reaction potential of the 4.3V electrode and applied by the start-up charge voltage sources applied to alternatingly to the interconnected electrode pairs.

Figure 9:
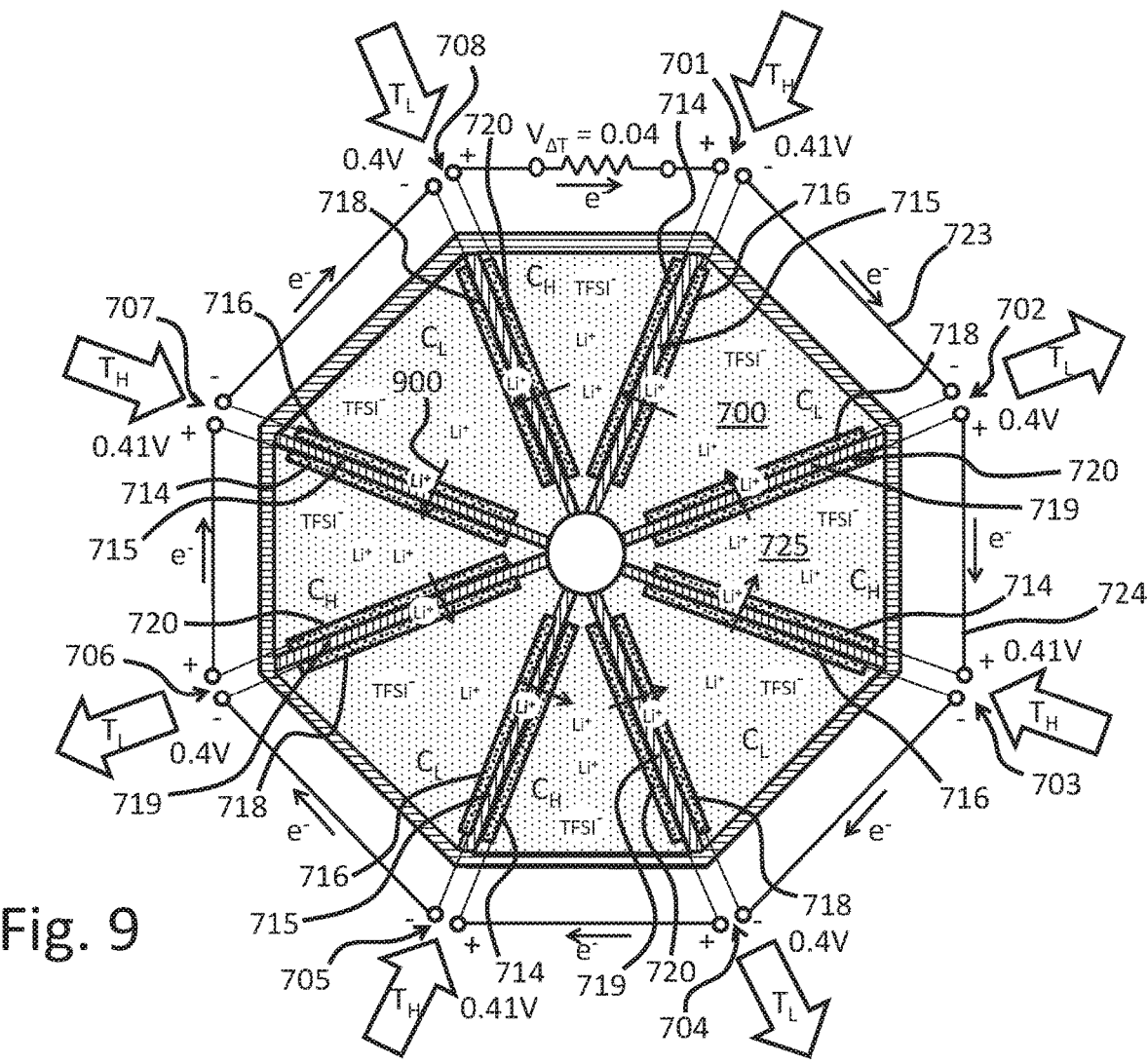
FIG. 9 is a diagram of a JTEC in a multi-MEA toroidal configuration that uses electrochemically active electrodes coupled to each other by an ion conductive electrolyte showing operation on heat to produce electrical power, in accordance with an embodiment of the present invention.

Now referring to FIG. 9, heat at temperature $T_H$ is input to the alternating first set of MEA cells 701, 703, 705, 707 to create and maintain an increase in temperature. Heat at temperature $T_L$ is removed from the alternating second set of MEA cells 702, 704, 706, 708 to maintain a constant temperature lower than that produced by heat input at $T_H$. The voltage change created between adjacent cells and thus the net voltage $V_{AT}$ applied across a load connected to electrodes 714 and 720 of cells 701 and 708, respectively, is a function of the difference in temperature between $T_H$ and $T_L$. Note that the cells are electrically interconnected in series so that the voltage difference between adjacent MEA pairs created by the temperature difference is additive. For example, consider the MEA pair 701 and 702. For a positive electrochemical temperature coefficient, the voltage of MEA cell 701 will be higher than that of MEA cell 702. The higher voltage of MEA cell 701 enables that MEA cell 701 to discharge itself by conducting ions from its high concentration electrode 716 through its electrolyte plane 715 to its low concentration electrode 714, thus driving a reverse current through the adjacent lower voltage MEA cell 702. The reverse current flow through MEA cell 702 causes that MEA cell 702 to pump an equivalent current of lithium ion flow from its low concentration electrode 720 through its electrolyte 719 to its high concentration electrode 718. Electrodes 718 and 716 of the adjacent MEA cells 702, 701, respectively, are electrically connected to each other by leads 723 so that they remain at equal voltage potential. Because of their equal potential, lithium is conducted by the electrolyte 700 from the first electrodes 718 of the second set of MEA cells 702, 704, 706, 708 to the second electrodes 716 of the first set of MEA cells 701, 703, 705, 707 as lithium enters the first electrodes 718, as an imbalance in lithium content would otherwise require an imbalance in voltage potential between the interconnected electrodes. Consistently, leads 724 electrically connect the second electrodes 720 of the second set of MEA cells 702, 704, 706, 708 and the first electrodes 714 of the first set of MEA cells 701, 703, 705, 707 to each other, so that electrical and ionic current flow continuity is maintained. As electrons are released in the second electrode 720 of the MEA cell 702, with oxidation and the conduction of ions through its electrolyte 719, the electrons are supplied to the first electrode 714 of the adjacent MEA cell 703 for the reduction of ions entering its first electrode 714 from its electrolyte 715. The first electrode 714 of the MEA cell 703 is connected to the second electrode 720 of the adjacent MEA cell 702, so as to maintain a voltage equilibrium, such that a balance in lithium content between the first and second electrodes 714 and 720 will be maintained by ionic conduction through electrolyte 725, and so on. Note that lithium is conducted continuously counterclockwise in the diagram whereas electrons are conducted clockwise. Note that in this example, $T_H$ and $T_L$ are selected relative to each other such that the voltage differential produced by each cell pair is 0.01 volts. The total voltage $V_{AT}$ for the four cell pairs is 0.04 volts.

Figure 10:
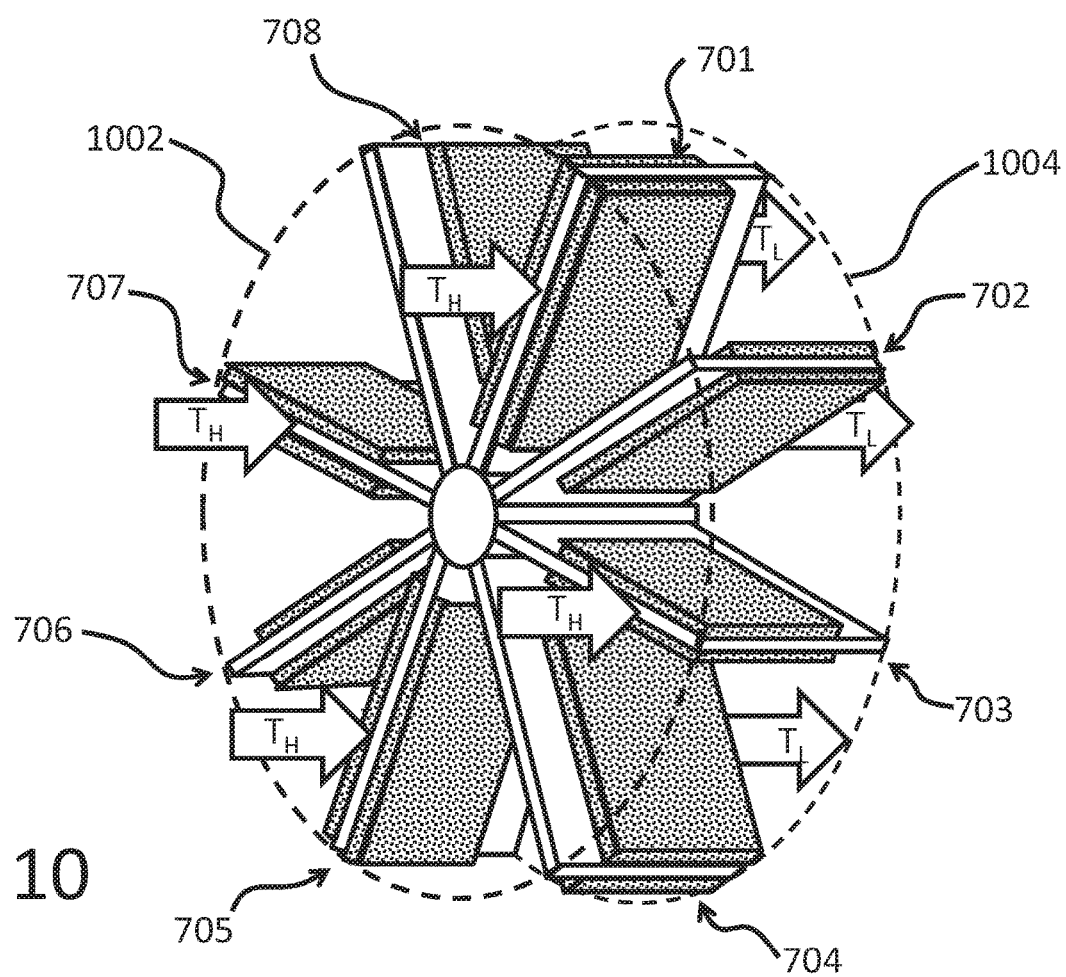
FIG. 10 is a three dimensional diagram of a JTEC in a multi-MEA toroidal configuration that uses electrochemically active electrodes showing heat input and output to produce electrical power.

FIG. 10 shows a three dimensional image showing thermal coupling of the electrodes 714, 716 of first set of MEA cells 701, 703, 705, 707 to a heat input plane 1002 at the temperature $T_H$. The electrodes 714, 716 of the first set of MEA cells 701, 703, 705, 707 extend forward for thermal contact with the plane 1002. On the other hand, the electrodes 718, 720 of the second set of MEA cells 702, 704, 706, 708 extend rearward to make thermal contact with a heat sink plane 1004 at the temperature $T_L$.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A direct heat to electricity converter comprising:
first and second membrane electrode assemblies coupled to each other, each membrane electrode assembly including a first porous electrode, a second porous electrode and a membrane sandwiched therebetween, the membrane being an ion conductive membrane;
a working fluid, ions of the working fluid being dispersed within the first and second membrane electrode assemblies,
wherein one of the first and second porous electrodes of each membrane electrode assembly has a high ion concentration and the other of the first and second porous electrodes of each membrane electrode assembly has a low ion concentration,
wherein the high ion concentration electrodes are ionically coupled to each other by a first ion conductive liquid electrolyte solution and the low ion concentration electrodes are ionically coupled to each other by a second ion conductive liquid electrolyte solution, the first and second electrolyte solutions comprising an anhydrous organic amine capable of dissolving the working fluid.

2. The direct heat to electricity converter according to claim 1, further comprising an external power source connected to the first porous electrodes and the second porous electrodes, power being applied to the electrodes and driving working fluid flow as electron flow forced by the external power source induces ion conductivity through the membrane of each membrane electrode assembly.

3. The direct heat to electricity converter according to claim 1, wherein the first and second ion conductive liquid electrolyte solutions contain dissolved ions, such that a concentration equilibrium is maintained between the low ion concentration electrodes and between the high ion concentration electrodes.

4. The direct heat to electricity converter according to claim 1, further comprising a heat sink coupled to one of the first and second membrane electrode assemblies and a heat source coupled to the other one of the first and second membrane electrode assemblies, such that the one of the first and second membrane electrode assemblies is electrically discharged while the other one of the first and second membrane electrode assemblies is electrically charged at different temperatures and voltages, the difference in temperature and voltage of the first and second membrane electrode assemblies resulting in net power generation.

5. The direct heat to electricity converter according to claim 1, wherein the working fluid is an alkali metal working fluid.

6. The direct heat to electricity converter according to claim 5, wherein the working fluid is lithium.

7. The direct heat to electricity converter according to claim 1, wherein a working fluid concentration level of the first ion conductive liquid electrolyte solution is higher than a working fluid concentration level of the second ion conductive liquid electrolyte solution.

* * * * *